United States Patent [19]

Bortnick et al.

[11] Patent Number: 5,410,017
[45] Date of Patent: Apr. 25, 1995

[54] CONTINUOUS THERMAL POLYCONDENSATION PROCESS FOR PREPARING POLYPEPTIDE POLYMERS

[75] Inventors: Newman M. Bortnick, Oreland; Robert E. Jerman, Chalfont; James M. Lipovsky, Langhorne, all of Pa.; Yi H. Paik, Princeton, N.J.; Ethan S. Simon, Ambler; Graham Swift, Blue Bell, both of Pa.

[73] Assignee: Rohm and Haas Company, Philadelphia, Pa.

[21] Appl. No.: 65,848

[22] Filed: May 21, 1993

[51] Int. Cl.$^6$ ................................. C08G 63/44
[52] U.S. Cl. ........................ 528/363; 526/64; 528/332
[58] Field of Search ............. 526/64; 528/363, 332

[56] References Cited

U.S. PATENT DOCUMENTS

| 3,052,655 | 9/1962 | Fox et al. | 528/313 |
| 3,474,083 | 10/1969 | Shiga et al. | 530/333 |
| 3,846,380 | 11/1974 | Fujimoto et al. | 525/328.2 |
| 3,923,753 | 12/1975 | Iwashita et al. | 528/377 |
| 4,363,797 | 12/1982 | Jacquet et al. | 424/70 |
| 4,590,260 | 5/1986 | Harada et al. | 528/328 |
| 4,696,981 | 9/1987 | Harada et al. | 522/176 |
| 4,839,461 | 6/1989 | Boehmke | 528/363 |
| 5,057,597 | 10/1991 | Koskan | 528/328 |
| 5,219,952 | 6/1993 | Koskan et al. | 525/419 |
| 5,219,986 | 6/1993 | Cassata | 528/328 |
| 5,221,733 | 6/1993 | Koskan et al. | 530/333 |
| 5,244,988 | 9/1993 | Hughes et al. | 526/93 |
| 5,286,810 | 2/1994 | Wood | 525/421 |
| 5,288,783 | 2/1994 | Wood | 525/418 |
| 5,292,858 | 3/1994 | Wood | 528/345 |
| 5,296,578 | 3/1994 | Koskan et al. | 528/363 |
| 5,319,145 | 6/1994 | Paik et al. | 528/328 |

FOREIGN PATENT DOCUMENTS

| 44-00939 | 4/1969 | Japan . |
| 53-00887 | 3/1977 | Japan . |
| 3271265 | 12/1991 | Japan . |

OTHER PUBLICATIONS

Fox, S., "Thermal Polycondensation of Alpha-Amino Acids," Analytical Methods of Protein Chemistry pp. 127–154, Permagon Press, Oxford (1966); Fox, S., et al., Thermal Copolymerization of Amino Acids in the Presence of Phosphoric Acid, Archives of Biochemistry and Biophysics, 86:281–285 (1960); Abstract of European Patent Application Number 0511037A Published Oct. 28, 1992.

Kokufuta, E., et al., "Temperature Effect on the Molecular Weight and the Optical Purity of Anhydropolyaspartic Acid Prepared by Thermal Polycondensation," Bul. Chem. Soc. Japan, 51(5):1555–1556 (1978); Neri, P., Synthesis of Alpha, Beta-Poly [(2-hydroxyethyl)-DL-aspartamide], a New Plasma Expander, Journal of Medicinal Chemistry 16(8):893–897 (1973).

*Primary Examiner*—John Kight, III
*Assistant Examiner*—Terressa Mosley
*Attorney, Agent, or Firm*—David T. Banchik

[57] ABSTRACT

A continuous process for preparing polymers is provided: The continuous process produces polymers from monoethylenically unsaturated acids or anhydrides, and a nitrogen-containing compound, optionally in the presence of a fluidizing agent. The polymers are useful as detergent additives, pigment and mineral dispersants, additives for fertilizers, and corrosion and scale inhibitors in boilers and cooling towers.

10 Claims, No Drawings

CONTINUOUS THERMAL POLYCONDENSATION PROCESS FOR PREPARING POLYPEPTIDE POLYMERS

The present invention relates to a continuous thermal polycondensation process for preparing polymers. In particular, the present invention relates to a continuous thermal polycondensation process for preparing polypeptides. More particularly, the present invention relates to the continuous thermal polycondensation of ethylenically unsaturated acids and anhydrides using ammonia, ammonium hydroxide or a primary amine.

Polypeptides, particularly polypeptides containing carboxylic acid moieties, such as poly(aspartic acid) and those which can be hydrolysed to contain carboxylic acid moieties, such as polysuccinimides, are useful as detergent additives, pigment and mineral dispersants, additives for fertilizers, and corrosion and scale inhibitors in boilers and cooling towers. Several processes are known for the production of poly(aspartic acid) and polysuccinimide. However, the known methods for these syntheses are complex, expensive, or require excessively long process times. The expense of these processes may be a result of the starting material used, the process conditions, or the recovery steps.

A method for the synthesis of poly(aspartic acid) from maleic acid and ammonia is disclosed in U.S. Pat. No. 4,839,461 to Boehmke. This process is carried out by heating an aqueous solution of maleic acid or maleic anhydride, which changes into maleic acid while being heated with water, and ammonia to give a dry melt of the monoammonium to biammonium salts which, if the temperature is raised is converted at 120° to 150° C. into poly(aspartic acid). Boehmke discloses that it is preferable to raise the temperature to 125° C. to 135° C. in the course of 4-6 hours and to keep it at this level for 0-2 hours. The maleic acid and ammonia are reacted in a molar ratio of 1:1-1.5. The mixture is then heated to 120°-150° C. and the resulting solution of ammonium salt of maleic acid is evaporated, leaving a crystal mash. The crystal mash is then melted, during which time the waters of condensation and crystallization distill off. A porous mass results. The entire process, resulting in poly(aspartic acid) having molecular weight of from 1,000 to 4,000, requires four to eight hours to complete.

The processes for the synthesis of polypeptides, such as Boehmke's method for preparing polysuccinimide, are time consuming, complex, expensive, and inefficient. Other methods for preparing polypeptides, such as those using amino acids as starting materials, are also time consuming, complex, expensive, inefficient, generate large amounts of waste and frequently have the added costs and complexities of handling solid materials.

The present invention seeks to overcome the problems associated with the prior art.

According to a first aspect of the present invention, there is provided a continuous process for preparing polymers comprising:
(A) continuously contacting
  (i) a fluid stream of one or more monomers selected from the group consisting of
    (a) monoethylenically unsaturated acids and salts thereof, and
    (b) monoethylenically unsaturated anhydrides with
  (ii) a gaseous or liquid stream of a nitrogen-containing compound selected from the group consisting of ammonia, ammonium hydroxide, primary amines and combinations thereof; and, optionally,
  (iii) a fluidizing agent; to provide a reaction mixture;
(B) continuously conveying the reaction mixture through a reactor;
(C) maintaining the reaction mixture in the reactor, at a temperature of from about 100° C. to about 300° C., to provide a residence time of from about 1 second to about 4 hours; and
(D) recovering a polymer product.

According to a second aspect of the present invention, there is provided a continuous process for preparing polymers comprising:
(A) continuously contacting
  (i) a fluid stream of maleic anhydride or maleic acid, and optionally, one or more monomers selected from the group consisting of
    (a) monoethylenically unsaturated acids, and
    (b) monoethylenically unsaturated anhydrides with
  (ii) a gaseous or liquid stream of a nitrogen-containing compound selected from the group consisting of ammonia, ammonium hydroxide and combinations thereof; and, optionally,
  (iii) a fluidizing agent; to provide a reaction mixture;
(B) continuously conveying the reaction mixture through a reactor;
(C) maintaining the reaction mixture in the reactor, at a temperature of from about 100° C. to about 300° C., to provide a residence time of from about 1 sec to about 4 hours; and
(D) recovering a polymer product of polysuccinimide.

The process of the present invention has the advantages of a continuous process, uses readily available and inexpensive starting materials, and is capable of producing solid polymer product.

One type of monomer suitable for the process of the present invention are monoethylenically unsaturated acids. Monoethylenically unsaturated acids can be mono-acids, di-acids or polyacids and the acids may be carboxylic acids, sulphonic acids, phosphonic acids, or salts or combinations thereof. Preferably, the monoethylenically unsaturated acids are carboxylic acids or salts thereof. Suitable monoethylenically unsaturated monoacids are, for example, acrylic acid, methacrylic acid, crotonic acid, and the alkali metal and ammonium salts thereof. Suitable monoethylenically unsaturated di-acids are, for example, maleic acid, cyclohexene dicarboxylic acid, itaconic acid, mesaconic acid, fumaric acid, citraconic acid, and the alkali metal and ammonium salts thereof. Preferred monoethylenically unsaturated acids are acrylic acid, methacrylic acid, maleic acid, fumaric acid and citraconic acid.

Another type of monomer suitable for the process of the present invention are monoethylenically unsaturated anhydrides. Suitable monoethylenically unsaturated anhydrides are, for example, the anhydrides of cis-dicarboxylic acids, such as maleic anhydride, tetrahydrophthalic anhydride, itaconic anhydride and citraconic anhydride. The preferred monoethylenically unsaturated anhydride is maleic anhydride.

Preferably, the one or more monomers will function as Michael-type acceptors under the conditions of the reaction since it is believed, although the present invention is not intended to be limited thereby, that the mechanism by which the polymerization reaction proceeds is via the Michael-type addition of one molecule into the ethylenically unsaturated bond of a second molecule.

The one or more monomers are used as a fluid stream. While some of these monomers suitable for the present invention are liquids at room temperature, others, such as maleic anhydride, need to be heated to achieve fluidity.

The one or more monomers are contacted with a gaseous or liquid stream of a nitrogen-containing compound selected from the group consisting of ammonia, ammonium hydroxide, primary amines and combinations thereof. Suitable primary amines include, for example, alkylamines and hydroxyalkylamines such as ethylamine, propylamine, butylamine, and the like, ethanolamine, propanolamine, and the like. Preferably, the one or more monomers are contacted with a gaseous or liquid stream of ammonia. The gaseous or liquid stream of the nitrogen containing compound is preferably used at a level which provides a molar ratio of the nitrogen containing compound to monomer of about 0.8-3:1, preferably from about 0.9-1.5:1 and most preferably about 1:1.

The one or more monomers and the nitrogen-containing compound are contacted, and are optionally contacted with a fluidizing agent. The fluidizing agent may be a component of one or more monomer streams, or it may be a component of the nitrogen-containing compound stream, or it may be a separate stream. Preferably, the fluidizing agent is a separate stream or is a component of the nitrogen-containing compound stream. Preferred fluidizing agents will function as a solvent, diluent, or suspending agent for the reaction mixture. By acting as a solvent, diluent or suspending agent, the fluidizing agent may serve to: increase the flowability of the reaction mixture as the reaction mixture proceeds through the reactor; increase the rate Of heat transfer between the reaction mixture and the surfaces of the reactor; increase the mixing efficiency of the reaction mixture as the reaction mixture proceeds through the reactor; make the product easier to handle.

Preferred fluidizing agents include, for example, water, poly(alkylene glycols), poly(alkylene oxides), surfactants and other high-boiling organic materials such as tetrahydronaphthalene, N-methylpyrrolidinone, sulfolane, dimethyl sulfoxide, and dimethylformamide. Most preferably, the fluidizing agent is water. When water is used as the fluidizing agent, it is preferably used at a level which provides a molar ratio of water to monomer of up to about 3:1, more preferably about 0.5-2:1, and most preferably about 0.75-1.3:1.

The one or more monomers, the nitrogen-containing compound, and optionally, the fluidizing agent are preferably contacted at a temperature of from about 55° C. to about 150° C. to provide the reaction mixture. The preferred temperature of the components upon contact may depend upon the heat transfer properties of the reactor. For example, if heat is being removed from the reaction mixture during the course of the reaction, it may be desirable to lower the temperature of the components upon contact. These components are preferably contacted by impinging streams of each of the components, or by introducing streams of each of the components into a device capable of mixing the components together. A suitable means for effectuating impinging streams is by forcing the separate streams of the components through ports, or nozzles so that the components contact each other at a distance from the pods or nozzles. The ports or nozzles are preferably positioned so that the exiting streams impinge in the reactor, or in or near the entrance to, the reactor. It is also preferable that there be a means of preventing the pods or nozzles from becoming clogged or blocked. Suitable means for preventing the pods or nozzles from becoming clogged or blocked, might be by intermittent plunging of the bore, or intermittent or continuous wiping of the tip.

After the reaction mixture is formed by contacting the one or more monomers, the ammonia or primary amine, and optionally, the fluidizing agent, the reaction mixture is continuously conveyed through the reactor. Suitable reactors are capable of maintaining the reaction mixture at a temperature of from about 100° C. to about 300° C., preferably from about 110° C. to about 280° C., and providing a residence time of from about 1 second to about 4 hours, preferably from about 5 seconds to about 2 hours. Examples of suitable reactors are single or multiple screw extruders, plug-flow reactors, tube reactors, scraped-wall reactors or heat exchangers, or other continuous reactors, and combinations thereof. Preferred reactors are extruders and tube reactors equipped with static mixing elements.

The reaction which occurs between the one or more monomers and the nitrogen-containing compound may be exothermic, such as, for example, the reaction which occurs between maleic anhydride and ammonia. Thus, it is possible to utilize this liberated heat to maintain the reaction mixture at an elevated temperature. This would reduce, or eliminate, the demand of external heat needed to maintain the reaction mixture at a temperature of from 100° C. to about 300° C. If the temperature is too low, it may be difficult to conduct the reaction to completion. If the temperature is too high, some decomposition of the polymer product may be observed. If the exotherm is too strong, it may be necessary to remove heat from the reactor during the reaction in order to maintain the reaction mixture at a temperature of from 100° C. to about 300° C.

Preferably, the reactor is operated under an elevated pressure of at least 1 atmosphere (atm), and most preferably at an elevated pressure of from about 15 to about 100 atm. It may be desirable to have one or more back-pressure control devices located along the reactor in order to maintain a pressure of from about 15 to about 100 atm. Back-pressure control devices can be used to control the temperature and pressure inside the reactor, for example, by allowing the removal of certain components from the reaction mixture, such as water, ammonia, fluidizing agents, and the like.

In one embodiment of the present invention, additional components are added to the reaction mixture. This can be accomplished, for example, by injecting additional components into the reaction mixture at one or more points along the reactor. For example, it may be desirable to control the viscosity of the reaction mixture. This may be accomplished by the addition of one or more of the fluidizing agents described above, or by the addition of a thickener, or diluent. It may also be desirable to add one or more catalysts, chain extenders, or cross-linking agents. For example, ethanolamine, glucosamine, lysine or diamines such as ethylenediamine may be added. Depending upon the intended use of the product, it may be desirable to add one or more components which are also used in the formulation of the final product, for example, poly(alkylene glycols), poly(alkylene oxides), biocides, pesticides, fillers and the like.

Additional components may also be components which react with the polymer. For example, when maleic anhydride or maleic acid is used as one of the monomers, the polymer may contain succinimide moieties. Polymers which contain succinimide moieties, such as polysuccinimide, contain units of the formula:

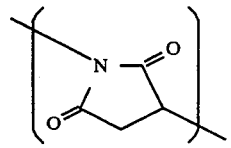

in the polymer chain. Additional components can be added which would react with the polymer by reacting with the succinimide moieties. Additional components such as bases, acids, and amines may react with succinimide moieties. Similarly, bases can be added as an additional component to neutralize any acid groups of the polymers.

The polymer product may be recovered in a solid or fluid form, and may optionally be recovered containing any fluidizing agents or other additional components which may have been added. It may be possible to obtain the polymer product as a pure product, for example, by reducing the pressure of the product to volatilize any volatile components present in the product stream. The polymer product may be, for example, a granular solid, flake, powder or liquid. The polymers are useful, for example, as detergent additives, pigment and mineral dispersants, additives for fertilizers, and corrosion and scale inhibitors in boilers and cooling towers The following examples are embodiments of the general process discussed hereinabove and are intended by way of illustration only and are not intended to limit the invention in any way. The weight average molecular weights ($M_w$) are measured by aqueous gel permeation chromatography (G.P.C.) relative to a 4,500 Mw poly(acrylic acid) standard.

EXAMPLE 1

A first "T"-shaped tube (having an inner diameter of 1/16th inch and a total volume of approximately 0.2 milliliters), equipped at one end with a means for introducing monomer into the tube and at another end with a means for introducing ammonia into the tube, was attached via the third end to one end of a second "T"-shaped tube (having an inner diameter of 1/16th inch and a total volume of approximately 0.2 milliliters). Another end of the second "T"-shaped tube was equipped with a means for introducing fluidizing agent, and the third end of the "T"-shaped tube was attached to one end of a Kenics brand static mixer (having an inner diameter of 3/16th inch and a total volume of approximately 1.5 milliliters). The other end of the static mixer was connected via a tube (having an inner diameter of 3/16th inch and a total volume of approximately 1.1 milliliters) to a back-pressure control device. The static mixer and the tube connecting it to the back-pressure control device were equipped with a thermocouple, steam tracing lines and insulation. Steam at a temperature of 140° C. was circulated through the tracing lines and the backpressure on the back-pressure control device was set at 250 psig. A sample of maleic anhydride was fluidized by heating to 130°-135 ° C., and was continuously pumped into one end of the first "T"-shaped tube at a rate of 11 grams/minute. The internal temperature of the reactor was raised to about 210°-220° C. by continuously pumping a 30 percent by weight aqueous solution of ammonium hydroxide into the second "T"-shaped tube at a rate of 9.0 grams/minute. The maleic anhydride was contacted with a nitrogen-containing compound to form a reaction mixture by continuously pumping a sample of anhydrous ammonia gas into another end of the first "T"-shaped tube at a rate of 2 grams/minute and the ammonium hydroxide solution, acting as a fluidizing agent, was slowed to a rate of 1.9 grams/minute. At equilibrium, the residence time was approximately 15 seconds. A tan product extruded from the back-pressure control device along with steam. Upon cooling the product hardened to a friable solid which was easily pulverized.

A sample of the product was dissolved in aqueous sodium carbonate and identified as polysuccinimide of greater than 98% purity according to analysis by NMR spectroscopy. The molecular weight of the polymer was 1610.

EXAMPLE 2

A similar procedure was followed as in Example 1 except that the static mixer was not used and the fluidizing agent was deionized water continuously pumped at a rate of 2.0 grams/minute. The product was polysuccinimide having Mw of 1140.

EXAMPLE 3

A "T"-shaped tube. (having an inner diameter of 1/16th inch and a total volume of approximately 0.2 milliliters), equipped at one end with a means for introducing monomer into the tube and at another end with a means for introducing ammonia into the tube, was attached to one end of a Kenics brand static mixer (having an inner diameter of 3/16th inch and a total volume of approximately 1.5 milliliters). The other end of the static mixer was connected via a tube (having an inner diameter of 3/16th inch and a total volume of approximately 1.1 milliliters) to a back-pressure control device. The static mixer and the tube connecting it to the back-pressure control device were equipped with a thermocouple, steam tracing lines and insulation. Steam at a temperature of 140° C. was circulated through the tracing lines and the backpressure on the back-pressure control device was set at 250 psig. A sample of maleic anhydride was fluidized by heating to 130°-135 ° C., and was continuously pumped into one end of the "T"-shaped tube at a rate of 11 grams/minute. The internal temperature of the reactor was raised to about 210°-220° C. by continuously pumping a 30 percent by weight aqueous solution of ammonium hydroxide into the other end of the "T"-shaped tube at a rate of 9.0 grams/minute. The aqueous ammonium hydroxide solution was slowed to a rate of 1.8 grams per minute and was combined with ammonia, flowing at 2.0 grams/minute, to form a stream of nitrogen-containing compound. The maleic anhydride was contacted with the stream of nitrogen-containing compound to form a reaction mixture by continuously pumping the stream of nitrogen-containing compound into another end of the "T"-shaped tube. At equilibrium, the residence time was approximately 15 seconds. The product was polysuccinimide having Mw of 1710.

EXAMPLE 4

A similar procedure was followed as in Example 1 except that the fluidizing agent pumped at a rate of 4.5 grams/minute. The product was polysuccinimide having Mw of 548.

EXAMPLE 5

A similar procedure was followed as in Example 1 except that the fluidizing agent was continuously pumped at a rate of 2.7 grams/minute. The product was polysuccinimide having Mw of 1780.

EXAMPLE 6

A similar procedure was followed as in Example 3 except that the maleic anhydride was fluidized by heating to 115°–120° C.; the stream of nitrogen-containing compound was formed from ammonia, flowing at 2.0 grams/minute, 30 percent by weight aqueous ammonium hydroxide, flowing at a rate of 1.4 grams per minute, and 25 percent by weight ethylenediamine dissolved in 30 percent by weight aqueous ammonium hydroxide, flowing at a rate of 1.2 grams per minute. The residence time was approximately 14 seconds. The product was polysuccinimide having Mw of 1950.

EXAMPLE 7

A similar procedure was followed as in Example 3 except that the maleic anhydride was fluidized by heating to 115°–120° C.; the stream of nitrogen-containing compound was formed from ammonia, flowing at 2.0 grams/minute, 30 percent by weight aqueous ammonium hydroxide, flowing at a rate of 0.7 grams per minute, and poly(ethylene glycol) having a molecular weight of 400, flowing at a rate of 3.8 grams per minute. The residence time was approximately 12 seconds. The product was polysuccinimide having Mw of 1090.

We claim:

1. A continuous thermal polycondensation process for preparing polymers comprising:
   (A) continuously contacting
      (i) a fluid stream of one or more monomers selected from the group consisting of
         (a) monoethylenically unsaturated acids and salts thereof, and
         (b) monoethylenically unsaturated anhydrides with
      (ii) a gaseous or liquid stream of a nitrogen-containing compound selected from the group consisting of ammonia, ammonium hydroxide, primary amines and combinations thereof;
      and, optionally,
      (iii) a fluidizing agent;
      to provide a fluid reaction mixture;
   (B) continuously conveying the fluid reaction mixture through a reactor;
   (C) maintaining the fluid reaction mixture in the reactor, at a temperature of from about 100° C. to about 300° C., to provide a residence time of from about 5 seconds to about 2 hours to polycondense the reaction mixture; and
   (D) recovering a polypeptide polymer product.

2. The process of claim 1, wherein: the monoethylenically unsaturated acids are selected from the group consisting of acrylic acid, methacrylic acid, crotonic acid, maleic acid, cyclohexene dicarboxylic acid, itaconic acid, mesaconic acid, fumaric acid, citraconic acid, and the alkali metal and ammonium salts thereof.

3. The process of claim 1, wherein: the monoethylenically unsaturated acids are selected from the group consisting of acrylic acid, methacrylic acid, maleic acid, fumaric acid and citraconic acid.

4. The process of claim 1, wherein: the monoethylenically unsaturated anhydrides are selected from the group consisting of maleic anhydride, tetrahydrophthalic anhydride, itaconic anhydride and citraconic anhydride.

5. The process of claim 1, wherein: the monoethylenically unsaturated anhydride is maleic anhydride.

6. The process of claim 1, wherein the molar ratio of nitrogen-containing compound to monomer is about 0.8–3:1.

7. The process of claim 1, wherein the molar ratio of ammonia to monomer is about 0.9–1.5:1.

8. The process of claim 1, wherein: the fluidizing agent is selected from the group consisting of water, poly(alkylene glycols), poly(alkylene oxides), surfactants, tetrahydronaphthalene, N-methylpyrrolidinone, sulfolane, dimethyl sulfoxide, and dimethylformamide.

9. The process of claim 1, wherein: the fluidizing agent is water and the molar ratio of water to monomer is up to about 3:1.

10. A continuous thermal polycondensation process for preparing polymers comprising:
   (A) continuously contacting
      (i) a fluid stream of maleic anhydride or maleic acid, and optionally, one or more monomers selected from the group consisting of
         (a) monoethylenically unsaturated acids, and
         (b) monoethylenically unsaturated anhydrides with
      (ii) a gaseous or liquid stream of a nitrogen-containing compound selected from the group consisting of ammonia, ammonium hydroxide and combinations thereof;
      and, optionally,
      (iii) a fluidizing agent;
      to provide a fluid reaction mixture;
   (B) continuously conveying the fluid reaction mixture through a reactor;
   (C) maintaining the fluid reaction mixture in the reactor, at a temperature of from about 100° C. to about 300° C., to provide a residence time of from about 5 seconds to about 2 hours, to polycondense the reaction mixture; and
   (D) recovering a polypeptide polymer product of polysuccinimide.

* * * * *